(12) United States Patent
Zhou et al.

(10) Patent No.: US 9,650,568 B2
(45) Date of Patent: May 16, 2017

(54) GERMANATE LUMINESCENT MATERIAL AND PREPARATION METHOD THEREFOR

(71) Applicants: OCEAN'S KING LIGHTING SCIENCE & TECHNOLOGY CO., LTD., Shenzhen (CN); SHENZHEN OCEAN'S KING LIGHTING ENGINEERING CO., LTD, Shenzhen (CN)

(72) Inventors: Mingjie Zhou, Shenzhen (CN); Rong Wang, Shenzhen (CN)

(73) Assignee: OCEAN'S KING LIGHTING SCIENCE & TECHNOLOGY CO., LTD., Shenzhen (CN)

(*) Notice: Subject to any disclaimer, the term of this patent is extended or adjusted under 35 U.S.C. 154(b) by 176 days.

(21) Appl. No.: 14/439,002

(22) PCT Filed: Oct. 31, 2012

(86) PCT No.: PCT/CN2012/083877
§ 371 (c)(1),
(2) Date: Apr. 28, 2015

(87) PCT Pub. No.: WO2014/067111
PCT Pub. Date: May 8, 2014

(65) Prior Publication Data
US 2015/0337199 A1 Nov. 26, 2015

(51) Int. Cl.
*C09K 11/59* (2006.01)
*C09K 11/66* (2006.01)
*C09K 11/87* (2006.01)

(52) U.S. Cl.
CPC .......... *C09K 11/662* (2013.01); *C09K 11/876* (2013.01)

(58) Field of Classification Search
CPC ......... C09K 11/02; C09K 11/66; C09K 11/58; C09K 11/87; C09K 11/662; C09K 11/876
See application file for complete search history.

(56) References Cited

U.S. PATENT DOCUMENTS

| | | | | |
|---|---|---|---|---|
| 2,210,087 A | * | 8/1940 | Leverenz | ............... C09K 11/59 252/301.6 F |
| 7,303,697 B2 | * | 12/2007 | Isobe | ..................... C09K 11/02 252/301.36 |
| 9,115,309 B2 | * | 8/2015 | Zhou | ...................... C01B 33/20 |

FOREIGN PATENT DOCUMENTS

| | | | |
|---|---|---|---|
| CN | 102337120 | * | 2/2012 |
| CN | 102337120 A | | 2/2012 |

(Continued)

OTHER PUBLICATIONS

Translation of CN 102337120, Feb. 1, 2012.*
(Continued)

*Primary Examiner* — Carol M Koslow
(74) *Attorney, Agent, or Firm* — Shimokaji IP

(57) ABSTRACT

The present invention provides a germanate luminescent material, a general molecular formula thereof being $Zn_{2-2x}GeO_4:Mn_{2x},M_y$, wherein M is selected from at least one of Ag, Au, Pt, Pd, and Cu metal nano particles; $0<x\leq0.05$; M is doped in $Zn_{2-2x}GeO_4:Mn_{2x}$, and y is a molar ratio of M to $Zn_{2-2x}GeO_4:Mn_{2x}$, $0<y\leq1\times10^{-2}$. The metal nano particle M is doped in a germanate luminescent substrate of the germanate luminescent material, and the metal nano particle M improves internal quantum efficiency of the luminescent material so that the germanate luminescent material has a high luminescent intensity. Also provided is a preparation method for the germanate luminescent material.

7 Claims, 2 Drawing Sheets

(56) References Cited

FOREIGN PATENT DOCUMENTS

| | | | |
|---|---|---|---|
| JP | 2000087032 A | 3/2000 | |
| JP | 2006089692 A | 4/2006 | |
| JP | 2009016268 A | 1/2009 | |
| JP | 2011140585 A | 7/2011 | |
| WO | 2011156955 A1 | 12/2011 | |
| WO | 2011156960 A1 | 12/2011 | |
| WO | WO 2012/000179 | * | 1/2012 |

OTHER PUBLICATIONS

Qiuhong Zhang, et al., Synthesis and characterization of Zn2GeO4 Mn2+ phosphor for field emission displays. Applied Physics A (2012) 108: 943-948.

* cited by examiner

GERMANATE LUMINESCENT MATERIAL AND PREPARATION METHOD THEREFOR

FIELD OF THE INVENTION

The present invention relates to the field of luminescent material, particularly to a germanate luminescent material and preparation method therefor.

BACKGROUND OF THE INVENTION

As a flat panel display technology, field emission display (FED) is of great potential. Operating voltage of FED is lower than that of the cathode ray tube (CRT), typically less than 5 kV, and the operating current density is relatively large, generally in a range of 10-100 $\mu A \cdot cm^{-2}$. Thus, the requirements for luminescent material of an FED of luminescent material is increasing, such as better chromaticity, higher luminescent efficiency at low voltage, and no luminance saturation at high current densities.

Currently, research of field emission displays luminescent materials mainly focuses on two aspects: First, to use and improve the existing cathode ray tube luminescent materials; Second, to find a new luminescent material. A primary commercially available luminescent material for CRT is oxide of sulfur. When an oxide of sulfur is used to prepare an FED, the luminescent intensity of FED will decrease because the sulfur may react with other elements existing in the cathode, such as molybdenum, silicon or germanium, thus weakening electron emissions.

SUMMARY OF THE INVENTION

In view of this, it is necessary to provide a germanate luminescent material with relatively high luminescent efficiency and preparation method therefor.

A germanate luminescent material having a general chemical formula of $Zn_{2-2x}GeO_4:Mn_{2x}$ which further contains M, where M is at least one of Ag, Au, Pt, Pd and Cu nanoparticles dispersed in the material; x is in a range of $0<x\leq0.05$, and y is a molar ratio of M to $Zn_{2-2x}GeO_4:Mn_{2x}$ in a range of $0<y\leq1\times10^{-2}$.

In one embodiment, x is in a range of $0.0005\leq x\leq0.02$.

In another embodiment, y is in a range of $1\times10^{-5}\leq y\leq5\times10^{-3}$.

A method for preparing a germanate luminescent material, comprising:

preparing a colloid containing M, where M is at least one of Ag, Au, Pt, Pd and Cu nanoparticles;

preparing an aqueous solution of ethanol containing Zn ions, Ge ions and Mn ions according to a stoichiometric ratio of corresponding elements in the chemical formula of $Zn_{2-2x}GeO_4:Mn_{2x}$, where x is in a range of $0<x\leq0.5$, and y is a molar ratio of M to $Zn_{2-2x}GeO_4:Mn_{2x}$ in a range of $0<y\leq1\times10^{-2}$, followed by adding citric acid and theb colloid containing M to obtain a mixture, then stirring the mixture at 60° C.-80° C. for a period of 2-6 hours to prepare a precursor;

drying the precursor to obtain a gel, then grinding and pre-calcining the gel at 400° C.-600° C. for a period of 1-6 hours to obtain solid matters; calcining the solid matters at 60020 C.-1400° C. for a period of 2-10 hours, then cooling to obtain a germanate luminescent material having a general chemical formula of $Zn_{2-2x}GeO_4:Mn_{2x}$ which further contains M.

In one embodiment, the colloid containing M is prepared by the following steps:

mixing a solution containing salt of metal M with an additive and a reducing agent, conducting a reaction for 10-45 minutes to obtain the colloid containing M, where the metal M is at least one of Ag, Au, Pt, Pd and Cu nanoparticles. The additive is at least one of polyvinylpyrrolidone, sodium citrate, cetyl trimethyl ammonium bromide, sodium dodecyl sulfate and sodium dodecyl sulfonate.

A concentration of the solution containing salt of metal M is in a range of $1\times10^{-3}$ mol/L-$5\times10^{-2}$ mol/L.

The additive is at least one of polyvinylpyrrolidone, sodium citrate, cetyl trimethyl ammonium bromide, sodium dodecyl sulfate and sodium dodecyl sulfonate.

A concentration of the additive is in a range of $1\times10^{-4}$ g/mL-$5\times10^{-2}$ g/mL to the colloid containing M.

The reducing agent is at least one of hydrazine hydrate, ascorbic acid, sodium citrate and sodium borohydride.

A molar ratio of the reducing agent to metal ions in the solution containing salt of metal M is in a range of 3.6:1-18:1.

In another embodiment, the aqueous solution of ethanol containing Zn ions, Ge ions and Mn ions is prepared by the following steps:

adding an aqueous solution of ethanol to a mixed solution containing Zn ions and Ge ions, followed by adding a solution of oxalate of Mn, a solution of nitrate of Mn or a solution of acetate of Mn to prepare the aqueous solution of ethanol containing Zn ions, Ge ions and Mn ions.

Further, the mixed solution containing Zn ions and Ge ions is prepared by the following steps:

dissolving an oxide of Zn or a carbonate of Zn in hydrochloric acid or nitric acid to prepare a solution containing Zn ions;

dissolving an oxide of Ge in an alkaline solution, or dissolving a chloride of Ge in a diluted hydrochloric acid to prepare a solution containing Ge ions;

mixing the solution containing Zn ions and the solution containing Ge ions to prepare the mixed solution containing Zn ions and Ge ions, or, mixing an acetate of Zn, a hydrochloride of Zn or a nitrate of Zn with the solution containing Ge ions to prepare the mixed solution containing Zn ions and Ge ions.

In an aqueous solution of ethanol of one embodiment, a volume ratio of ethanol to water is in a range of 3-8:1.

In another embodiment, a molar ratio of citric acid to total amount of the Zn ions, Ge ions and Mn ions is in a range of 1-5:1.

In yet another embodiment, the method further comprises a step of adding a surfactant to the mixture before the mixture is stirred at 60° C.-80° C. for a period of 2-6 hours.

In still another embodiment, the surfactant is polyethylene glycol with a molecular mass in a range of 100-20000; a concentration of polyethylene glycol is in a range of 0.05 g/mL-0.20 g/mL.

Metal nanoparticle M is doped in germanate host of the germanate luminescent material. The metal nanoparticle M increases internal quantum efficiency of the material, thus increasing its luminescent intensity.

$10^{-4}$, compared with $Zn_{1.992}GeO_4:Mn_{0.008}$ luminescent material, under 3 kv voltage, according to Example 3.

DETAILED DESCRIPTION OF ILLUSTRATED EMBODIMENTS

Further description of the germanate luminescent material and preparation method therefor will be illustrated, which combined with preferred embodiments and the drawings.

In one embodiment, a germanate luminescent material has a general chemical formula of $Zn_{2-2x}GeO_4:Mn_{2x}$ which further contains M, where M is at least one of silver (Ag), gold (Au), platinum (Pt), palladium (Pd) and copper (Cu) nanoparticles dispersed in the material. x is in a range of $0<x\le0.05$, and a preferred range is $0.0005\le x\le0.02$.

The notation ":" means doping and substitution. The germanate luminescent material uses $Zn_2GeO_4$ as a host, and manganese ion $Mn^{2+}$ is doped in $Zn_2GeO_4$ and partially replace Zn to achieve $Zn_{2-2x}GeO_4:Mn_2$.

M is doped in $Zn_{2-2x}GeO_4:Mn_{2x}$ to form a germanate luminescent having a general chemical formula of $Zn_{2-2x}GeO_4:Mn_{2x}$, where y is a molar ratio of M to $Zn_{2-2x}GeO_4:Mn_2$ in a range of $0<y\le1\times10^{-2}$, preferably $1\times10^{-5}\le y\le5\times10^{-3}$.

Manganese (II) ion ($Mn^{2+}$) serves as an activator ion which enables the germanate material to emit green fluorescence under an applied voltage.

As a wide bandgap (about 4.4 eV) semiconductor material, $Zn_2GeO_4$ has advantages such as good stability, non-toxic and high brightness. $Zn_2GeO_4$ is used as a luminescent host, which gives the germanate luminescent material high brightness and good stability. Further, it would not release toxic substances during use. The germanate luminescent material is safe and environmentally friendly.

Metal nanoparticle M is doped in germanate host of the germanate luminescent material. The metal nanoparticle M increases internal quantum efficiency of the material, thus increasing its luminescent intensity.

Figure 1:
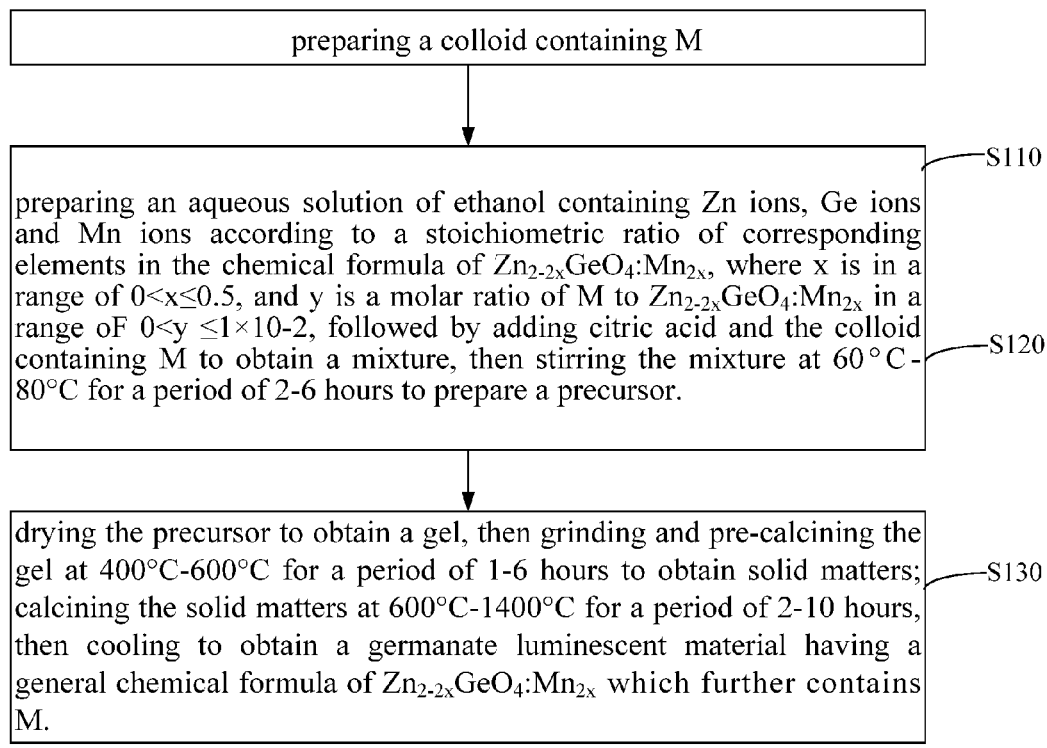
FIG. 1 is a flow diagram showing the preparation of the germanate luminescent material according to one embodiment of the present invention.

As shown in FIG. 1, a method for preparing germanate luminescent material comprises the steps of S110, S120 and S130.

Step S110: preparing a colloid containing M.

Metal M herein is at least one of Ag, Au, Pt, Pd and Cu nanoparticles.

The colloid containing M is prepared by mixing a solution containing salt of metal M with an additive and a reducing agent, then conducting a reaction to obtain the colloid containing M, where the metal M is at least one of Ag, Au, Pt, Pd and Cu. Under the premise of obtaining a colloid containing M, in order to save energy, the reaction temperature is preferably from 10 minutes to 45 minutes.

The solution containing salt of metal M comprises solution containing metal chloride and solution containing metal nitrate, and the metal M is at least one of Ag, Au, Pt, Pd and Cu. The solution containing salt of metal M can be prepared as desired. A concentration of the solution in a range of $1\times1^{-3}$ mol/L-$5\times10^{-2}$ mol/L is preferred.

The additive is at least one of polyvinylpyrrolidone (PVP), sodium citrate, cetyl trimethyl ammonium bromide, sodium dodecyl sulfate and sodium dodecyl sulfonate. A concentration of the additive is in a range of $1\times10^{-4}$ g/mL-$5\times10^{-2}$ g/mL to the colloid containing M.

The reducing agent is at least one of hydrazine hydrate, ascorbic acid, sodium citrate and sodium borohydride. An aqueous solution of the reducing agent is prepared, and the reducing agent is in an amount of $1\times10^{-4}$ mol/L-1 mol/L to water. Then the reducing agent reacts with the solution containing salt of metal M and the additive, where M is at least one of Ag, Au, Pt, Pd and Cu.

A molar ratio of the reducing agent to metal ions in the solution containing salt of metal M is in a range of 3.6:1-18:1.

In the presence of reducing agent and additive, Ag, Au, Pt, Pd or Cu ions are reduced into Ag, Au, Pt, Pd or Cu nanoparticles and disperse in solvent, thus obtaining a colloid containing M.

Step S120: preparing an aqueous solution of ethanol containing Zn ions, Ge ions and Mn ions according to a stoichiometric ratio of corresponding elements in the chemical formula of $Zn_{2-2x}GeO_4:Mn_{2x}$, where x is in a range of $0<x\le0.5$, and y is a molar ratio of M to $Zn_{2-2x}GeO_4:Mn_{2x}$ in a range of $0<y\le1\times10^{-2}$, followed by adding citric acid and the colloid containing M to obtain a mixture, then stirring the mixture at 60° C.-80° C. for a period of 2-6 hours to prepare a precursor.

The aqueous solution of ethanol containing Zn ions, Ge ions and Mn ions is prepared by the following steps:
adding an aqueous solution of ethanol to a mixed solution containing Zn ions and Ge ions, followed by adding a solution of oxalate of Mn, a solution of nitrate of Mn or a solution of acetate of Mn to prepare the aqueous solution of ethanol containing Zn ions, Ge ions and Mn ions.

The aqueous solution of ethanol herein is a mixed solution of ethanol and water in a volume ratio of 3-8:1.

Further, the mixed solution containing Zn ions and Ge ions is prepared by the following steps.

Dissolving an oxide of Zn or a carbonate of Zn in hydrochloric acid or nitric acid to prepare a solution containing Zn ions. The oxide of Zn could be zinc oxide (ZnO), and the carbonate of Zn could be zinc carbonate ($ZnCO_3$).

Dissolving an oxide of Ge in an alkaline solution, or dissolving a chloride of Ge in a diluted hydrochloric acid to prepare a solution containing Ge ions. The oxide of Ge could be germanium oxide ($GeO_2$), and the chloride of Ge could be germanium tetrachloride ($GeCl_4$).

Mixing the solution containing Zn and the solution containing Ge to prepare the mixed solution containing Zn ions and Ge ions.

Oxide of Zn or carbonate of Zn is readily soluble in hydrochloric acid or nitric acid. Oxide of Ge is readily soluble in an alkaline solution. To prepare a solution of Zn ions and an alkaline solution of Ge ions will benefit the dissolution of zinc compound and germanium compound.

In another embodiment, a water-soluble acetate of Zn, such as zinc acetate ($Zn(CH_3COO)_2.2H_2O$)), is permitted. A hydrochloride of Zn, such as zinc chloride ($ZnCl_2$), or a nitrate of Zn, such as zinc nitrate ($Zn(NO_3)_2.6H_2O$) are also permitted.

In the case where an acetate of Zn, a hydrochloride of Zn or a nitrate of Zn is used, the acetate of Zn, the hydrochloride of Zn or the nitrate of Zn is mixed with the solution containing Ge and dissolved in an aqueous solution of ethanol. The aqueous solution of ethanol is prepared by mixing ethanol and water according to a volume ratio of 3-8:1.

In yet another embodiment, a water-soluble salt of zinc (such as zinc acetate) is mixed with an oxide of germanium (such as germanium oxide), followed by adding an alkaline mixed solution of ethanol and water. After that, a solution containing Mn ions is added to the mixed solution to obtain an aqueous solution of ethanol containing Zn ions, Ge ions and Mn ions.

Germanium oxide is readily soluble in an alkaline solution. The alkaline mixed solution of ethanol and water can dissolve germanium oxide. Herein, alkalinity of the alkaline mixed solution of ethanol and water is regulated by adding a base (such as ammonia water).

The colloid containing M and citric acid are added to the aqueous solution of ethanol containing Zn ions, Ge ions and Mn ions. The citric acid serves as a chelating agent.

Preferably, a molar ratio of citric acid to total amount of the Zn ions, Ge ions and Mn ions is in a range of 1-5:1.

Preferably, a surfactant is added to the mixture. Before adding the surfactant, the colloid containing M remains stable relying on electrostatic repulsive force among the colloid particles. The surfactant is used to repress the colloid particles' tendency to aggregate, thus improving the stability of the colloid.

The surfactant could form a molecular film on the surface of the colloid particles to prevent their contact with each other, and reduce surface tension and capillary adsorption. The Steric hindrance is weakened, thus preventing the aggregation. After the colloid particles adsorb the surfactant, the bonding interactions of —OH on the surface of the colloid particles could be reduced, further increasing the dispersibility of the colloid and reducing aggregation of colloid particles.

The surfactant is polyethylene glycol (PEG) with a molecular mass in a preferred range of 100-20000, i.e. PEG100-2000. A more preferred range is 2000-10000.

Polyethylene glycol having an average molecular weight in a range of 2000-10000 has suitable viscosity, which enables strong hydrogen bonds to form between the PEG and the colloid particles. Therefore, a hydrophilic macromolecular film forms on the surface of the colloid particles, improving the dispersibility of the colloid and reducing aggregation of colloid particles.

Preferably, a concentration of polyethylene glycol is in a range of 0.05 g/mL-0.20 g/mL.

Preparing a mixture of the aqueous solution of ethanol containing Zn ions, Ge ions and Mn ions, and citric acid, and the colloid containing M, then stirring the mixture at 60° C.-80° C. for a period of 2-6 hours to prepare a precursor. X is in a range of $0<x\leq0.05$, and y is a molar ratio of M to $Zn_{2-2x}GeO_4:Mn_{2x}$ in a range of $0<y\leq1\times10^{-2}$.

Step S130: drying the precursor to obtain a gel, then grinding and pre-calcining the gel at 400° C.-600° C. for a period of 1-6 hours to obtain solid matters; calcining the solid matters at 600° C.-1400° C. for a period of 2-10 hours, then cooling to obtain a germanate luminescent material having a general chemical formula of $Zn_{2-2x}GeO_4:Mn_{2x}$ which further contains M.

The precursor colloid is dried at 70° C.-150° C. for 6-20 hours to remove solvent and obtain a gel. The gel is pre-calcined at 400° C.-600° C. for 1-6 hours to obtain solid matters. The solid matters are calcined for 2-10 hours to obtain the germanate luminescent material having a general chemical formula of $Zn_{2-2x}GeO_4:Mn_{2x}$ which further contains M, where M is at least one of Ag, Au, Pt, Pd and Cu nanoparticles, dispersed in the material; x is in a range of $0<x\leq0.05$, and y is a molar ratio of M to $Zn_{2-2x}GeO_4:Mn_{2x}$ in a range of $0<y\leq1\times10^{-2}$.

Before the step of pre-calcining, the gel is grinded. Before the step of calcining, the pre-calcined gel is grinded again. The gel is grinded twice, thus obtaining tiny particles of germanate luminescent material and a consistent particle size distribution.

The method for preparing germanate luminescent material is simple, easy to control, non-polluting and suitable for industrial production. It has a broad application prospect.

The present invention will be described below in detail referring to preferred embodiments.

Example 1

Preparation of $Zn_{1.99}GeO_4:Mn_{0.01}$ which further contains Pd, where a molar ratio of Pd to $Zn_{1.99}GeO_4:Mn_{0.01}$ is $1\times10^{-5}$ by a sol-gel method.

(1) Preparation of Colloid Containing Pd Nanoparticles.

0.22 mg of palladium chloride ($PdCl_2 \cdot 2H_2O$) was dissolved in 19 mL of deionized water. After palladium chloride dissolved completely, 11.0 mg of sodium citrate and 4.0 mg of sodium dodecyl sulfate were weighed and added to the mixed solution obtained previously while magnetically stirring. 3.8 mg of sodium borohydride were dissolved in 10 mL of deionized water to obtain 10 mL of $1\times10^{-2}$ mol/L aqueous solution of sodium borohydride. While magnetically stirring, 1 mL of $1\times10^{-2}$ mol/L aqueous solution of sodium borohydride was rapidly added to the mixed solution obtained previously. Then the reaction was performed for 20 min to obtain 20 mL of colloid containing Pd nanoparticles having a concentration of $5\times10^{-5}$ mol/L.

(2) Preparation of a Precursor.

6.5521 g of zinc acetate ($Zn(CH_3COO)_2 \cdot 2H_2O$) and 1.5696 g of germanium oxide ($GeO_2$) were placed in a container, followed by adding 50 mL of a mixed alkaline solution of ethanol and water in a volume ratio 4:1 (alkalinity of the solution was regulated by ammonia water). 1.5 mL of a solution of manganese nitrate ($Mn(NO_3)_2 \cdot 4H_2O$) with a concentration of 0.1 mol/L, 3 mL of a colloid containing Pd nanoparticles with a concentration of $5\times10^{-5}$ mol/L, 8.6454 g of citric acid and 2.75 g of PEG100 were added to the mixed alkaline solution, while stirring in an 80° C. water-bath. After 2 hours, a transparent uniform precursor colloid was obtained.

(3) Preparation of $Zn_{1.99}GeO_4:Mn_{0.01}$ which further contains Pd, where a molar ratio of Pd to $Zn_{1.99}GeO_4:Mn_{0.01}$ is $1\times10^{-5}$.

The precursor colloid was dried at 70° C. for 20 hours to evaporate solvent, thus obtaining a gel. The gel was then grinded into powders and pre-calcined in a box furnace at 600° C. for 2 hours to obtain solid matters. The solid matters were then calcined at 900° C. for 4 hours, and then cooled to obtain a germanate luminescent material having a general chemical formula of $Zn_{1.99}GeO_4:Mn_{0.01}$ which further contains Pd, where a molar ratio of Pd to $Zn_{1.99}GeO_4:Mn_{0.01}$ is $1\times10^{-5}$.

Example 2

Preparation of $Zn_{1.98}GeO_4:Mn_{0.02}$ which further contains Au, where a molar ratio of Au to $Zn_{1.98}GeO_4:Mn_{0.02}$ is $1\times10^{-2}$ by a sol-gel method.

(1) Preparation of Colloid Containing Au Nanoparticles.

20.6 mg of chloroauric acid ($AuCl_3 \cdot HCl \cdot 4H_2O$) were dissolved in 16.8 mL of deionized water, followed by adding 14 mg of sodium citrate and 6 mg of cetyl trimethyl ammonium bromide while magnetically stirring to obtain a mixed solution. 1.9 mg of sodium borohydride and 17.6 mg of ascorbic acid were separately dissolved in 10 mL of deionized water to obtain 10 mL of a solution of sodium borohydride having a concentration of $5\times10^{-3}$ mol/L, and 10 mL of a solution of ascorbic acid having a concentration of $1\times10^{-2}$ mol/L. While stirring, 0.08 mL of the solution of sodium borohydride was added to the mixed solution. After 5 minutes, 3.12 mL of the solution of ascorbic acid was added to the mixed solution. The reaction was conducted for 30 minutes to produce 20 mL of colloid containing Au nanoparticles having a concentration of $5\times10^{-2}$ mol/L.

(2) Preparation of a Precursor.

0.3223 g g of zinc oxide (ZnO) was dissolved in 1 mL of a concentrated nitric acid and 1 mL of deionized water and then placed in a container. 0.4289 g of germanium tetrachloride ($GeCl_4$) was dissolved in 3 mL of diluted hydrochloric acid and added to the container, followed by adding 50 mL of a mixed alkaline solution of ethanol and water in a volume ratio 3:1. 2 mL of a solution of manganese oxalate ($MnC_2O_4.2H_2O$) with a concentration of 0.02 mol/L, 0.4 mL of a colloid containing Au nanoparticles with a concentration of $5\times10^{-2}$ mol/L, 5.7636 g of citric acid and 6 g of PEG2000 were added to the mixed alkaline solution, while stirring in a 60° C. water-bath. After 4 hours, a transparent uniform precursor colloid was obtained.

(3) Preparation of $Zn_{1.98}GeO_4:Mn_{0.02}$ which further contains Au, where a molar ratio of Au to $Zn_{1.98}GeO_4:Mn_{0.02}$ is $1\times10^{-2}$.

The precursor colloid was dried at 150° C. for 20 hours to evaporate solvent, thus obtaining a gel. The gel was then grinded into powders and pre-calcined in a box furnace at 500° C. for 6 hours to obtain solid matters. The solid matters were then calcined at 1400° C. for 2 hours, and then cooled to obtain a germanate luminescent material having a general chemical formula of $Zn_{1.98}GeO_4:Mn_{0.02}$ which further contains Au, where a molar ratio of Au to $Zn_{1.98}GeO_4:Mn_{0.02}$ is $1\times10^{-2}$.

Example 3

Preparation of $Zn_{1.992}GeO_4:Mn_{0.008}$ which further contains Ag, where a molar ratio of Ag to $Zn_{1.992}GeO_4:Mn_{0.008}$ is $2.5\times10^{-4}$ by a sol-gel method.

(1) Preparation of Colloid Containing Ag Nanoparticles.

3.4 mg of silver nitrate ($AgNO_3$) was dissolved in 18.4 mL of deionized water, followed by adding 42 mg of sodium citrate to obtain a mixed solution. 5.7 mg of sodium borohydride were dissolved in 10 mL of deionized water to obtain a solution of sodium borohydride having a concentration of $1.5\times10^{-2}$ mol/L. While stirring, 1.6 mL of the solution of sodium borohydride was rapidly added to the mixed solution. The reaction was conducted for 10 minutes to produce 20 mL of colloid containing Ag nanoparticles having a concentration of $1\times10^{-3}$ mol/L.

(2) Preparation of a Precursor.

1.7778 g of zinc nitrate ($Zn(NO_3)_2.6H_2O$) was placed in a container. 0.6433 g g of germanium tetrachloride ($GeCl_4$) was dissolved in 5 mL of diluted hydrochloric acid and added to the container, followed by adding 50 mL of a mixed alkaline solution of ethanol and water in a volume ratio 8:1. 2.4 mL of a solution of manganese acetate ($Mn(CH_3COO)_2$) with a concentration of 0.01 mol/L, 0.75 mL of a colloid containing Ag nanoparticles with a concentration of $1\times10^{-3}$ mol/L, 6.9163 g of citric acid and 5 g of PEG10000 were added to the mixed alkaline solution, while stirring in a 70° C. water-bath. After 4 hours, a transparent uniform precursor colloid was obtained.

(3) Preparation of $Zn_{1.992}GeO_4:Mn_{0.008}$ which further contains Ag, where a molar ratio of Ag to $Zn_{1.992}GeO_4:Mn_{0.008}$ is $2.5\times10^{-4}$.

The precursor colloid was dried at 120° C. for 8 hours to evaporate solvent, thus obtaining a gel. The gel was then grinded into powders and pre-calcined in a box furnace at 400° C. for 4 hours to obtain solid matters. The solid matters were then calcined at 900° C. for 4 hours, and then cooled to obtain a germanate luminescent material having a general chemical formula of $Zn_{1.992}GeO_4:Mn_{0.008},Ag_{2\times5^{-4}}$.

Figure 2:
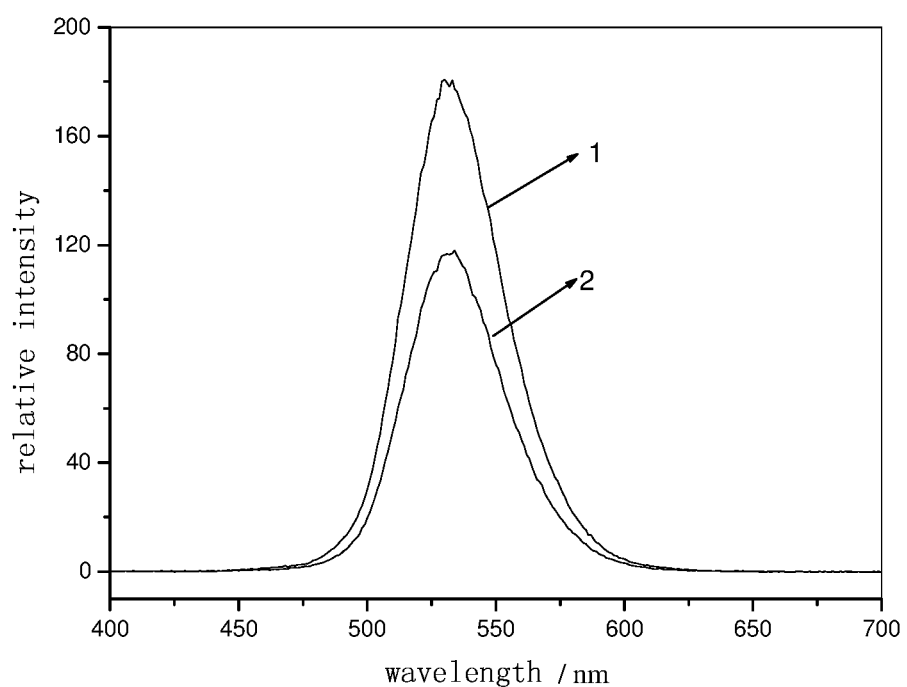
FIG. 2 is cathodoluminescence spectra of $Zn_{1.992}GeO_4:Mn_{0.008}$ luminescent material which further contains Ag, where a molar ratio of Ag to $Zn_{1.992}GeO_4:Mn_{0.008}$ is 2.5×

FIG. 2 is cathodoluminescence spectra of $Zn_{1.992}GeO_4:Mn_{0.008},Ag_{2.5\times10}-4$ luminescent material, compared with $Zn_{1.992}GeO_4:Mn_{0.008}$ luminescent material, under 3 kv voltage, according to this embodiment. Herein, curve 1 is for $Zn_{1.992}GeO_4:Mn_{0.008},Ag_{2\times10}-4$, and curve 2 is for $Zn_{1.992}GeO_4:Mn_{0.008}$.

It can be seen from FIG. 2 that the emission peak shown at about 535 nm. in comparison to the $Zn_{1.992}GeO_4:Mn_{0.008}$, $Zn_{1.992}GeO_4:Mn_{0.008}$ which further contains Ag has luminescent intensity greater than 25%. The luminescent material of this embodiment has good stability, purity and high luminescent intensity.

Example 4

Preparation of $Zn_{1.96}GeO_4:Mn_{0.04}$ which further contains Pt, where a molar ratio of Pt to $Zn_{1.96}GeO_4:Mn_{0.04}$ is $5\times10^{-3}$ by a sol-gel method.

(1) Preparation of Colloid Containing Pt Nanoparticles.

103.6 mg of chloroplatinic acid ($H_2PtCl_6.6H_2O$) were dissolved in 17 mL of deionized water, followed by adding 40.0 mg of sodium citrate and 60.0 mg of sodium dodecyl sulfonate while magnetically stirring to obtain a mixed solution. 1.9 mg of sodium borohydride was dissolved in 10 mL of deionized water to obtain a solution of sodium borohydride having a concentration of $5\times10^{-3}$ mol/L. 10 mL of a solution of hydrazine hydrate having a concentration of $5\times10^{-2}$ mol/L were prepared. While stirring, 0.4 mL of the solution of sodium borohydride was added to the mixed solution. After 5 minutes, 2.6 mL of the solution of hydrazine hydrate was added to the mixed solution. The reaction was conducted for 40 minutes to produce 10 mL of colloid containing Pt nanoparticles having a concentration of $1\times10^{-2}$ mol/L.

(2) Preparation of a Precursor.

1.2679 g of zinc carbonate ($ZnCO_3$) was dissolved in 5 mL of a diluted nitric acid and then placed in a container. 1.0723 g of germanium tetrachloride ($GeCl_4$) was dissolved in 5 mL of diluted hydrochloric acid and added to the container, followed by adding 45 mL of a mixed alkaline solution of ethanol and water in a volume ratio 3:1. 2 mL of a solution of manganese acetate ($Mn(CH_3COO)_2$) with a concentration of 0.1 mol/L, 2.5 mL of a colloid containing Pt nanoparticles with a concentration of $1\times10^{-2}$ mol/L, 5.7642 g of citric acid and 12 g of PEG200 were added to the mixed alkaline solution, while stirring in a 65° C. water-bath. After 4 hours, a transparent uniform precursor colloid was obtained.

(3) Preparation of $Zn_{1.96}GeO_4:Mn_{0.04}$ which further contains Pt, where a molar ratio of Pt to $Zn_{1.96}GeO_4:Mn_{0.04}$ is $5\times10^{-3}$.

The precursor colloid was dried at 100° C. for 8 hours to evaporate solvent, thus obtaining a gel. The gel was then grinded into powders and pre-calcined in a box furnace at 600° C. for 1 hour to obtain solid matters. The solid matters were then calcined at 1200° C. for 2 hours, and then cooled to obtain a germanate luminescent material having a general chemical formula of $Zn_{1.96}GeO_4:Mn_{0.04}$ which further contains Pt, where a molar ratio of Pt to $Zn_{1.96}GeO_4:Mn_{0.04}$ is $5\times10^{-3}$.

Example 5

Preparation of $Zn_{1.999}GeO_4:Mn0.001$ which further contains Cu, where a molar ratio of Cu to $Zn_{1.98}GeO_4:Mn_{0.01}$ is $1\times10^{-4}$ by a sol-gel Method.

(1) Preparation of Colloid Containing Cu Nanoparticles.

2.4 mg of copper nitrate $(Cu(NO_3)_2.3H_2O)$ were dissolved in 16 mg of ethanol. After the copper nitrate completely dissolved, 12 mg of PVP were added to the solution while stirring. Then 0.4 mg of sodium borohydride was dissolved in 10 mL of ethanol to obtain 4 mL of a solution of sodium borohydride with a concentration of $1\times10^{-3}$ mol/L. The reaction was performed for 10 minutes to obtain 20 mL of a colloid containing Cu nanoparticles with a concentration of $6\times10^{-4}$ mol/L.

(2) Preparation of a Precursor.

4.0869 g of zinc chloride $(ZnCl_2)$ and 3.2167 g of germanium tetrachloride $(GeCl_4)$ were placed in a container, followed by adding 50 mL of a mixed alkaline solution of ethanol and water in a volume ratio 4:1. 1.5 mL of a solution of manganese nitrate $(Mn(NO_3)_2.4H_2O)$ with a concentration of 0.01 mol/L, 2.5 mL of a colloid containing Cu nanoparticles with a concentration of $6\times10^{-4}$ mol/L, 8.6454 g of citric acid and 2.5 g of PEG20000 were added to the mixed alkaline solution, while stirring in a 60° C. water-bath. After 6 hours, a transparent uniform precursor colloid was obtained.

(3) Preparation of $Zn_{1.999}GeO_4:Mn_{0.001}$ which further contains Cu, where a molar ratio of Cu to $Zn_{1.999}GeO_4:Mn_{0.001}$ is $1\times10^{-4}$.

The precursor colloid was dried at 80° C. for 15 hours to evaporate solvent, thus obtaining a gel. The gel was then grinded into powders and pre-calcined in a box furnace at 600° C. for 3 hours to obtain solid matters. The solid matters were then calcined at 600° C. for 10 hours, and then cooled to obtain a germanate luminescent material having a general chemical formula of $Zn_{1.999}GeO_4:Mn_{0.001}$ which further contains Cu, where a molar ratio of Cu to $Zn_{1.999}GeO_4:Mn_{0.001}$ is $1\times10^{-4}$.

Example 6

Preparation of $Zn_{1.9}GeO_4:Mn_{0.1}$ which further contains Ag and Au, where a molar ration of Ag and Au to $Zn_{1.9}GeO_4:Mn_{0.1}$ is $1.25\times10^{-3}$ by a sol-gel method.

(1) Preparation of Colloid Containing $Ag_{0.5}/Au_{0.5}$ Nanoparticles.

6.2 mg of chloroauric acid $(AuCl_3.HCl.4H_2O)$ and 2.5 mg of silver nitrate were dissolved in 28 mL of deionized water, followed by adding 22 mg of sodium citrate and 20 mg of polyvinylpyrrolidone (PVP) while magnetically stirring to obtain a mixed solution. 5.7 mg of sodium borohydride were dissolved in 10 mL of deionized water to obtain a solution of sodium borohydride having a concentration of $1.5\times10^{-2}$ mol/L. While stirring, 2 mL of the solution of sodium borohydride was rapidly added to the mixed solution. The reaction was conducted for 20 minutes to produce 30 mL of colloid containing Ag and Au nanoparticles having a total concentration of $1\times10^{-3}$ mol/L.

(2) Preparation of a Precursor.

0.7732 g of zinc oxide (ZnO) was dissolved in 1 mL of a concentrated nitric acid and 1 mL of deionized water and then placed in a container. 1.0722 g of germanium tetrachloride $(GeCl_4)$ was dissolved in 5 mL of diluted hydrochloric acid and added to the container, followed by adding 45 mL of a mixed alkaline solution of ethanol and water in a volume ratio 3:1. 2.5 mL of a solution of $MnC_2O_4$ with a concentration of 0.2 mol/L, 6.25 mL of a colloid containing Ag/Au nanoparticles with a concentration of $1\times10^{-3}$ mol/L, 8.6454 g of citric acid and 8 g of PEG4000 were added to the mixed alkaline solution, while stirring in a 70° C. water-bath. After 4 hours, a transparent uniform precursor colloid was obtained.

(3) Preparation of $Zn_{1.9}GeO_4:Mn_{0.1}$ which further contains Ag and Au, where a molar ratio of Ag and Au to $Zn_{1.9}GeO_4:Mn_{0.1}$ is $1.25\times10^{-3}$.

The precursor colloid was dried at 100° C. for 12 hours to evaporate solvent, thus obtaining a gel. The gel was then grinded into powders and pre-calcined in a box furnace at 500° C. for 5 hours to obtain solid matters. The solid matters were then calcined at 1200° C. for 2 hours, and then cooled to obtain a germanate luminescent material having a general chemical formula of $Zn_{1.9}GeO_4:Mn_{0.1}$ which further contains Ag and Au, where a molar ratio of Ag and Au to $Zn_{1.9}GeO_4:Mn_{0.1}$ is $1.25\times10^{-3}$.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the scope of the present invention.

What is claimed is:

1. A method for preparing a germanate luminescent material, comprising:
   preparing a colloid containing M, wherein M is at least one of Ag, Au, Pt, Pd and Cu nanoparticles;
   preparing an aqueous solution of ethanol containing Zn ions, Ge ions and Mn ions according to a stoichiometric ratio of corresponding elements in the chemical formula of $Zn_{2-2x}GeO_4:Mn_{2x}$, x is in a range of $0<x\leq0.05$, y is a molar ratio of M to $Zn_{2-2x}GeO_4:Mn_{2x}$ and y is in a range of $0<y\leq1\times10^{-2}$, followed by adding citric acid and the colloid containing M to obtain a mixture, then stirring the mixture at 60° C.-80° C. for a period of 2-6 hours to prepare a precursor;
   drying the precursor to obtain a gel, then grinding and pre-calcining the gel at 400° C.-600° C. for a period of 1-6 hours to obtain solid matters; calcining the solid matters at 600° C.-1400° C. for a period of 2-10 hours, then cooling to obtain a germanate luminescent material having a general chemical formula of $Zn_{2-2x}GeO_4:Mn_{2x}$ which further contains M.

2. The method for preparing a germanate luminescent material according to claim 1, wherein the colloid containing M is prepared by the following steps:
   mixing a solution containing salt of metal M with an additive and a reducing agent, conducting for 10-45 minutes to obtain the colloid containing M, and the metal M is at least one of Ag, Au, Pt, Pd and Cu nanoparticles;
   a concentration of the solution containing salt of metal M is in a range of $1\times10^{-3}$ mol/L-$5\times10^{-2}$ mol/L;
   the additive is at least one of polyvinylpyrrolidone, sodium citrate, cetyl trimethyl ammonium bromide, sodium dodecyl sulfate and sodium dodecyl sulfonate;
   a concentration of the additive is in a range of $1\times10^{-4}$ g/mL-$5\times10^{-2}$ g/mL to the colloid containing M;
   the reducing agent is at least one of hydrazine hydrate, ascorbic acid, sodium citrate and sodium borohydride;

a molar ratio of the reducing agent to metal ions in the solution containing salt of metal M is in a range of 3.6:1-18:1.

3. The method for preparing a germanate luminescent material according to claim 1, wherein the aqueous solution of ethanol containing Zn ions, Ge ions and Mn ions is prepared by the following steps:

adding an aqueous solution of ethanol to a mixed solution containing Zn ions and Ge ions, followed by adding a solution of oxalate of Mn, a solution of nitrate of Mn or a solution of acetate of Mn to prepare the aqueous solution of ethanol containing Zn ions, Ge ions and Mn ions;

further, the mixed solution containing Zn ions and Ge ions is prepared by the following steps:

dissolving an oxide of Zn or a carbonate of Zn in hydrochloric acid or nitric acid to prepare a solution containing Zn ions;

dissolving an oxide of Ge in an alkaline solution, or dissolving a chloride of Ge in a diluted hydrochloric acid to prepare a solution containing Ge ions;

mixing the solution containing Zn ions and the solution containing Ge ions to prepare the mixed solution containing Zn ions and Ge ions, or mixing an acetate of Zn, a hydrochloride of Zn or a nitrate of Zn with the solution containing Ge ions to prepare the mixed solution containing Zn ions and Ge ions.

4. The method for preparing a germanate luminescent material according to claim 1, wherein in the aqueous solution of ethanol, a volume ratio of ethanol to water is in a range of 3-8:1.

5. The method for preparing a germanate luminescent material according to claim 1, wherein a molar ratio of citric acid to total amount of the Zn ions, Ge ions and Mn ions is in a range of 1-5:1.

6. The method for preparing a germanate luminescent material according to claim 1, further comprising a step of adding a surfactant to the mixture before the mixture is stirred at 60° C.-80° C. for a period of 2-6 hours.

7. The method for preparing a germanate luminescent material according to claim 6, wherein the surfactant is polyethylene glycol with a molecular mass in a range of 100-20000; a concentration of polyethylene glycol is in a range of 0.05 g/mL-0.20g/mL.

* * * * *

UNITED STATES PATENT AND TRADEMARK OFFICE
CERTIFICATE OF CORRECTION

| | |
|---|---|
| PATENT NO. | : 9,650,568 B2 |
| APPLICATION NO. | : 14/439002 |
| DATED | : May 16, 2017 |
| INVENTOR(S) | : Mingjie Zhou and Rong Wang |

It is certified that error appears in the above-identified patent and that said Letters Patent is hereby corrected as shown below:

On the Title Page

Item (73) Assignee's information should read:
OCEAN'S KING LIGHTING SCIENCE & TECHNOLOGY CO., LTD.
Shenzhen (CN)
SHENZHEN OCEAN'S KING LIGHTING ENGINEERING CO., LTD.
Shenzhen (CN)

Signed and Sealed this
Tenth Day of October, 2017

Joseph Matal
*Performing the Functions and Duties of the*
*Under Secretary of Commerce for Intellectual Property and*
*Director of the United States Patent and Trademark Office*